May 16, 1933.   N. A. PALMGREN   1,909,420
DOUBLE ACTING COIL SPRING CLUTCH
Filed Nov. 18, 1931   2 Sheets-Sheet 1

INVENTOR
ATTORNEY

May 16, 1933.  N. A. PALMGREN  1,909,420
DOUBLE ACTING COIL SPRING CLUTCH
Filed Nov. 18, 1931    2 Sheets-Sheet 2
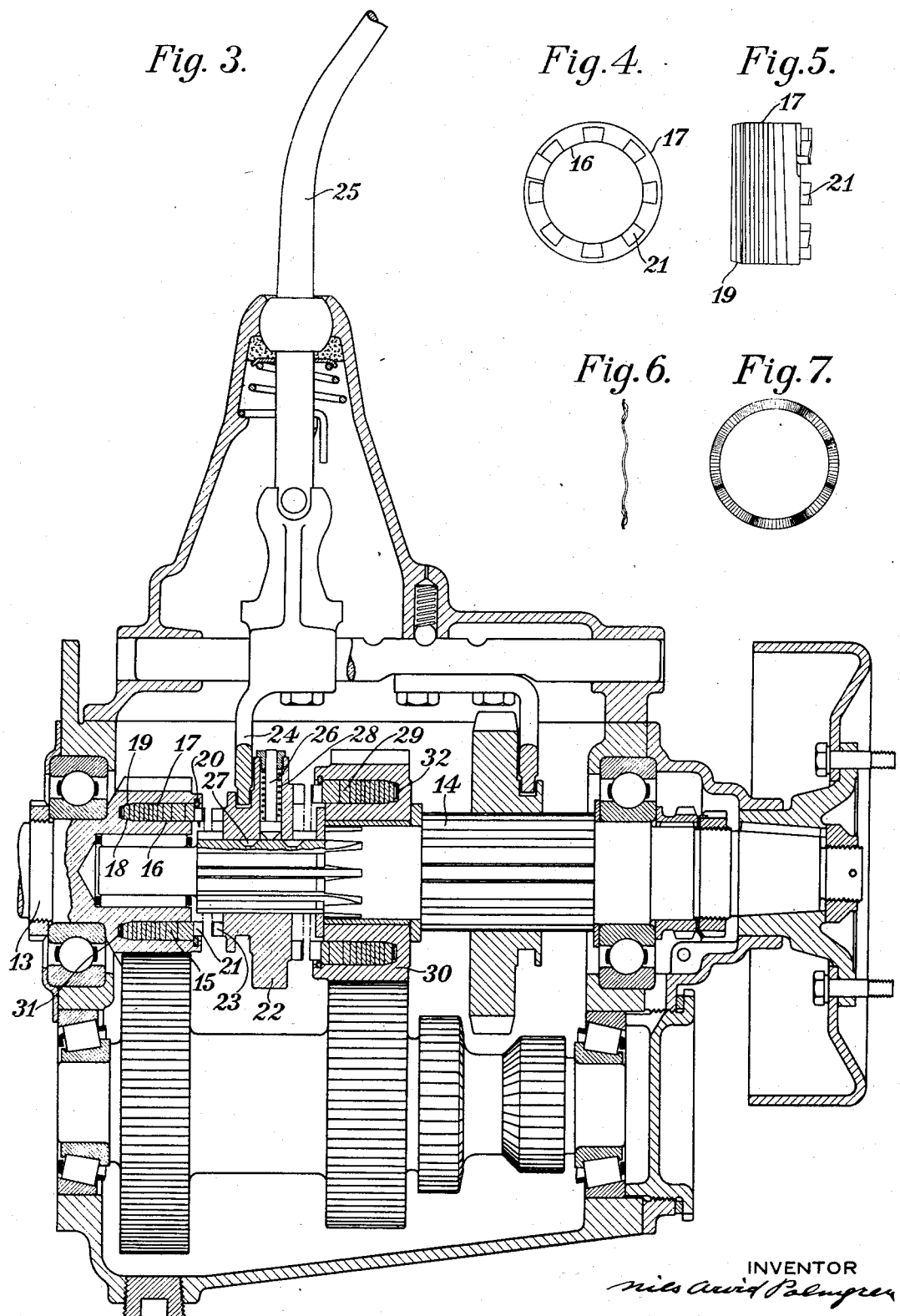
Fig. 3.
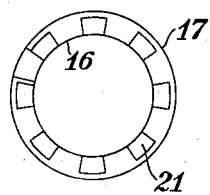
Fig. 4.
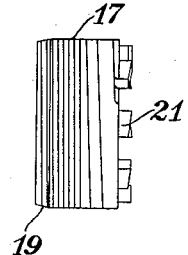
Fig. 5.
Fig. 6.  Fig. 7.
INVENTOR
*Nils Arvid Palmgren*
By *Chas. Lyon Russell*
his ATTORNEY Patented May 16, 1933

1,909,420

UNITED STATES PATENT OFFICE

NILS ARVID PALMGREN, OF GOTHENBURG, SWEDEN

DOUBLE-ACTING COIL SPRING CLUTCH

Application filed November 18, 1931, Serial No. 575,712, and in Sweden November 21, 1930.

This invention relates generally to coil spring clutches and more particularly to a double-acting coil spring clutch which can transmit torque from one shaft to another in either forward or reversed direction. Besides providing a reversible coil friction clutch, one object of the invention is to provide a clutch which can be easily and conveniently disengaged and which can be thrown in in all relative rotational positions of the two shafts.

A further object of the invention is to provide a coil spring clutch in which the material of the various members is subjected only to tension or compression at the points at which the stress is greatest.

I accomplish the above and other objects by providing inner and outer frictional surfaces on the coil spring and a clutch member connected to one of the shafts and having friction surfaces for engaging the inner and outer friction surfaces of the coil spring, and I also provide means for connecting the coil spring to the other shaft.

Figure 1:
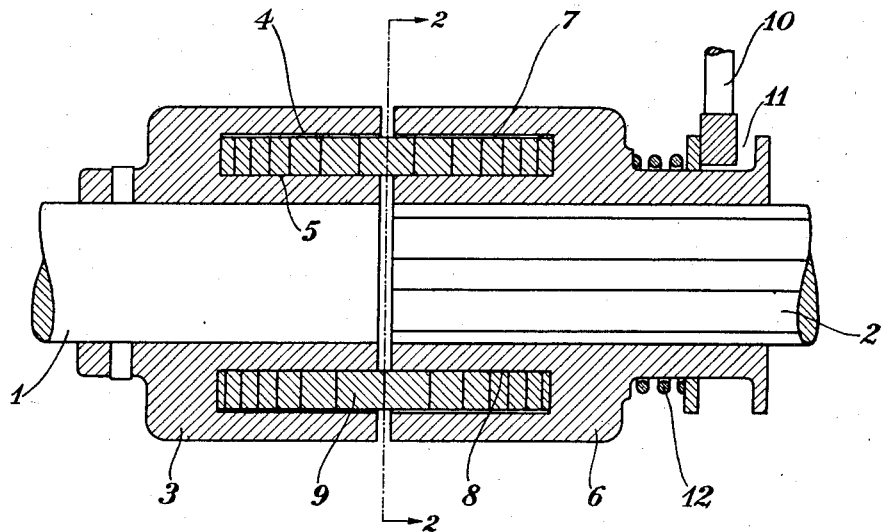
Figure 2:
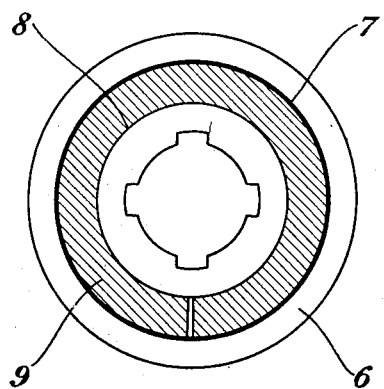

The accompanying drawings illustrate two modifications of my invention; Fig. 1 is a longitudinal section of my clutch arranged to connect two shafts; Fig. 2 is a transverse section on the line 2—2 of Fig. 1; Fig. 3 is a longitudinal section through a gear box for automobiles to which a clutch according to a modification of my invention has been applied; Fig. 4 shows an end view and Fig. 5 a side view of the coil spring member in Fig. 3; Figs. 6 and 7 show respectively a section and face view of a counter spring for preventing inadvertent operation of the clutch.

In the modification of my invention illustrated in Fig. 1 the clutch connects two shafts 1 and 2. A clutch member 3 is pinned or keyed to the shaft 1. The clutch member 3 is provided with an axially extending annular groove having inner and outer cylindrical concentric surfaces 4 and 5 concentric with the axis of rotation of the shaft. A clutch member 6 is splined to the shaft 2 and is, therefore, capable of axial motion but incapable of turning motion relative to the shaft. The clutch member 6 is provided with an axially extending annular groove similar to that in the clutch member 3 and having cylindrical surfaces 7 and 8. A coil spring 9 is located in the annular grooves having equal parts of its length in each groove. This spring is substantially rectangular in cross section. The sectional height of the spring is constant along its whole length but the width varies from the center outwards, being greatest at the center, i. e. at the junction of the two clutch members 3 and 6 and diminishing successively towards the ends of the spring. The inner diameter of the spring when free is somewhat greater than that of the surfaces 5 and 8 which are of the same or approximately the same diameter. Similarly the outer diameter of the spring is somewhat less than the diameter of the surfaces 4 and 7 which are of the same or approximately the same diameter.

To disengage the clutch a shift lever 10 engaging a groove 11 in the clutch element 6 is operated to shift the clutch member 6 axially sufficiently to relieve the spring of all axial compression. To throw in the clutch, the clutch member 6 is first moved forward by means of the shift lever 10 until the bottoms of the annular grooves in the members 3 and 6 engage the ends of the spring which are in the present instance plane. Further motion of the shift lever 10 will compress the spring 12, thus subjecting the coil spring 9 to an axial pressure. Through the friction on the ends of the spring a relative turning motion of the two shafts in one direction will cause a winding up of the spring with a resulting contraction of the end turns of the spring and an unwinding with an expansion of the end turns if the relative turning motion is in the other direction. A continued relative turning motion of the shafts will result in a continued winding or unwinding of the spring, and the contraction or expansion will proceed from turn to turn until finally the central part of the coil is brought into engagement with the clutch members. When the spring has in this manner been brought into engagement along its entire length with the clutch members, the connection between the shafts is complete, and there will be no further relative turning motion between the shafts. The power is thus transmitted from one shaft to the other as follows. The tangential force is transmitted through friction between the clutch member and the spring, through the central section of the spring as tension or compression and to the other clutch member through friction between the spring and the clutch member.

In Fig. 1 the spring is shown engaging the inner surfaces 5 and 8 of the clutch members, in which case the central section of the spring will be subjected only to tension. Since the surfaces of the spring and those of the clutch members are surfaces of rotation, the torque will be transmitted from one clutch member to the other through the spring entirely by friction between the spring and the clutch members. There are no projections or sharp bends in the spring, and there will therefore be no additional stresses in the material due to abrupt changes of section.

When the spring grips the clutch elements, it will be successively wound tight against the surfaces without slipping. The frictional forces between the spring and the clutch surfaces, which increase rapidly with the number of turns, will be sufficient to transmit the torque without slipping if a sufficient number of turns are provided.

The invention is illustrated in Fig. 3 as applied to a gear box for automobiles. The gear box may be of standard design and does not form part of my present invention and will be described only as far as necessary to explain my invention.

One of the rotatable members is in this case the primary shaft 13 of the gear box and the other the main drive shaft 14. The shaft 13 is provided with an axially extending groove for receiving the coil spring 15. The coil spring has an inner frictional surface 16 and an outer frictional surface 17. Between these surfaces and the corresponding surfaces of the groove in the shaft 13 there is a certain small amount of play. This play is, however, so small that it cannot be shown without considerable exaggeration in a small scale of drawing. The spring is beveled at its inner end thus forming conical surfaces 18 and 19 fitting against corresponding conical friction surfaces of the groove. The spring is retained in the groove by a ring 20 and is therefore freely rotatable in the groove, as long as it is not subjected to an axial pressure. The spring 15 is further provided at its outer end with dogs or claws 21.

An axially slidable sleeve 22 is mounted on the shaft 14 and is prevented from turning relatively to the shaft by splines. The sleeve 22 is provided with dogs or claws 23, which fit into spaces between corresponding claws 21 on the spring 15. When the sleeve 22 is in the position shown in the drawing, the claw clutch 21—23 is disengaged, and no power is transmitted between the shafts 13 and 14. If the sleeve 22 is now moved in a direction toward the spring 15 by means of the gear shifter 24, the claws 21 will engage the claws 23, and the spring 15 will be compelled to rotate at the same speed as the shaft 14. If the sleeve 22 is now axially pressed against the spring 15, the conical surfaces of the latter will be brought into engagement with the corresponding conical surfaces of the shaft 13, and frictional forces will thereby be generated, which wind or unwind and thus contract or expand the spring 15 depending on the direction of the relative turning motion between the shafts and depending on whether the spring is right-hand or left-hand wound. One of the friction surfaces 16 or 17 will thereby be pressed against the corresponding surface of the groove, and a manifold frictional force will be obtained increasing until it is finally capable of transmitting the torque from the shaft 13 through the spring 15 and the sleeve 22 to the shaft 14 or in the opposite direction. By a suitable choice of the number of turns of the spring and the force with which the spring is pressed into the groove it is possible to fix a certain suitable limit to the maximum torque capable of being transmitted. If this maximum value is exceeded, the clutch will slip. This limitation of the maximum value of the torque is of especial value for the prevention of excessive shocks when the clutch is thrown in.

The claws 21 and 23 engage each other with practically no shock or noise even when the shafts 13 and 14 are rotating at different speeds, since only the small mass of the spring 15 need thereby be accelerated. Only when the spring is subjected to an axial pressure does it connect the shafts and thereby cause these comparatively large masses to assume the same speed of rotation. This axial pressure can be transmitted from the shift lever 25 through the gear shifter 24 to the sleeve 22 but must be maintained during the whole time the clutch is thrown in. For this purpose I provide a disengageable locking pin 26 mounted in the sleeve 22. The inner end of this locking pin is conical and is adapted to enter a recess 27 when the sleeve 22 has been brought into engagement with the spring 15. The spring 28 then forces the locking pin 26 against the sloping side of the recess 27 thereby pressing the whole sleeve 22 against the spring 15. It is thus unnecessary to maintain the pressure on the gear shifter after the connection has been completed. The angle of taper of the conical end of the locking pin is such that while the pressure of the sleeve 22 against the spring 15 is sufficient to ensure the transmission of the load, the plunger will be raised and the clutch released when the shift lever is operated by hand.

The gear box illustrated in Fig. 3 is also provided with a second clutch of the same design as that above described. This clutch connects the gear wheel 30 with the sleeve 22 through the spring 29.

The spring 15 is illustrated in Figs. 4 and 5, of which the former shows an end view and the latter a side view. The right-hand or outer end of the spring is provided with claws 21. The sectional area of the spring is greatest at this end and diminishes toward the other end, the width of the section becoming successively less. The inner and outer friction surfaces 16 and 17 are cylindrical and adjoin the conical surfaces 18 and 19. The end surfaces of the claws 21 are inclined or beveled as are those of the claws 23 of the sleeve 22. This is for the purpose of facilitating the engagement of the claws when the primary shaft 13 rotates at a lower speed than the shaft 14 when the clutch is thrown in.

To prevent the conical surfaces 18 and 19 of the spring from coming into contact with the groove before it is desired to throw in the clutch a sinuous or corrugated annular spring 31 illustrated in Figs. 6 and 7 is provided between the spring 15 and the bottom of the groove. This spring 31 serves to keep the spring 15 pressed outwards against the ring 20 until it is purposely brought into engagement with the conical faces of the groove. The spring 29 is combined with a similar annular spring 32. The springs 31 and 32 are comparatively weak and are compressed when the clutch is thrown in thus allowing the conical surfaces 18 and 19 of the coil spring to come into engagement with the corresponding conical faces of the groove.

Although the invention has been described in connection with a limited number of specific embodiments, it should be understood that the scope of the invention is not limited to the constructions and arrangements shown but includes all such modifications thereof as fall within the scope of the appended claims.

Having described my invention, I claim and desire to secure by Letters Patent:

1. A double-acting coil spring clutch for connecting co-axial rotatable bodies comprising a coil spring having inner and outer friction surfaces, a clutch member connected to one of the rotatable bodies and having friction surfaces for engaging the inner and outer surfaces of one portion of the coil spring and a clutch member connected to the other rotatable body and having friction surfaces constructed and adapted to engage the inner and outer surfaces of another portion of the coil spring.

2. A double-acting coil spring clutch for connecting co-axial rotatable bodies comprising a coil spring having inner and outer friction surfaces, a clutch member having friction surfaces for engaging the inner and outer surfaces of the coil spring and means for engaging the coil spring to the other rotatable body, said coil spring being axially slidable in relation to the clutch member.

3. A double-acting coil spring clutch for connecting co-axial rotatable bodies comprising a coil spring having inner and outer friction surfaces and inner and outer conical surfaces at one end thereof, means for connecting the coil spring to one of the rotatable bodies and a clutch member connected to the other rotatable body having inner and outer friction surfaces for engaging the inner and outer friction surfaces of the coil spring and two conical surfaces adapted for engaging simultaneously the two conical surfaces of the coil spring.

NILS ARVID PALMGREN.